United States Patent Office 2,985,620
Patented May 23, 1961

2,985,620

STABILIZATION OF PERFLUOROCHLOROCARBON PLASTICS

Francis J. Honn, Westfield, N.J., assignor, by mesne assignments, to Minnesota Mining and Manufacturing Company, St. Paul, Minn., a corporation of Delaware No Drawing. Filed Aug. 16, 1956, Ser. No. 604,298

15 Claims. (Cl. 260—45.75)

This invention relates to the treatment of perfluorochlorocarbon plastics. In one aspect, the invention relates to the stabilization of polytrifluorochloroethylene plastics. In another aspect, the invention relates to a method of improving heat aging characteristics of polytrifluorochloroethylene plastics.

This application is a continuation-in-part of my prior and copending application Serial No. 370,859, filed July 28, 1953, now abandoned.

Polytrifluorochloroethylene plastics are prepared by the polymerization of the monomer, trifluorochloroethylene. The preparation of monomeric trifluorochloroethylene may be accomplished by various methods. One method comprises dechlorinating trifluorotrichloroethane, commercially available as Freon 113, under suitable conditions of dechlorination in the presence of a suitable solvent, such as methyl alcohol, with a dehalogenating agent, such as zinc dust, to produce an effluent comprising the monomer, unreacted trifluorotrichloroethane and solvent. Another method comprises dechlorinating trifluorotrichloroethane by passing said material over a catalyst selected from the group IB and group VIII metals, and combinations thereof, in the presence of hydrogen, at a temperature above about 200° C. The effluent obtained from either of the above outlined processes is then passed to a suitable fractional distillation system in which substantially pure trifluorochloroethylene is recovered. It is usually preferred to conduct distillations in the presence of a terpene compound at a temperature above about 25° C. since this treatment removes impurities which are detrimental to the production of high molecular weight polymers. The terpene treatment step may be conducted with the first distillation step or at any convenient time prior to the introduction of the monomer into the polymerization zone.

The monomer, obtained as described above, is polymerized under suitable polymerization conditions with or without the presence of a suitable catalyst or promoter. Such conditions may comprise the use of a suitable catalyst, such as bis-trichloroacetyl peroxide, dissolved in a suitable solvent such as trichlorofluoromethane at a temperature between about −20° C. and about 50° C. An additional polymerization process employing substantially the same conditions as described above may be used. In this process a different type of polymerization reactor is employed and the polymer is formed as a suspension in the monomer and is recovered therefrom by evaporation.

The polymer produced by either of the above described processes is characterized by wholly different chemical and physical characteristics than otherwise similar but non-fluorinated polymeric materials. The chemical resistance of polytrifluorochloroethylene is such that it will withstand exposure to a wide variety of oxidizing, reducing and solvent-type materials such as fuming nitric acid, concentrated sulfuric acid, hydrazine, hydrogen peroxide, acetone, aniline, etc. Physically, the material possesses high heat stability, tensile strength, etc. In addition to the above, these polymers are readily molded into various useful articles such as valves, gaskets, etc. using conventional equipment but with modified operating conditions.

However, when polymers of trifluorochloroethylene are maintained at elevated temperatures for prolonged periods of time, degradation occurs. This degradation is, in reality, a thermal cracking of the polymer chain with a consequent reduction in molecular weight of the polymer and is evidenced by a reduction in the N.S.T. ("no strength temperature," a measure of molecular weight) of the polymer. Thus, when a polymer having an N.S.T. of 332° C. is maintained at a temperature of about 325° C. for one hour the N.S.T. is reduced to 235° C. Slight degradation may also occur during the molding operations particularly when a polymer is maintained at high temperatures for excessive periods of time.

The term polymer as used herein, includes both homopolymers and copolymers.

It is an object of this invention to provide a process for improving the thermal stability of polymers of trifluorochloroethylene.

It is another object of this invention to provide a means for stabilizing polymers of trifluorochloroethylene.

It is one of the more particular objects of this invention to improve the thermal stability of polytrifluorochloroethylene.

Various other objects and advantages will become apparent to those skilled in the art on reading the accompanying description and disclosure.

Generally, the above objects are accomplished by admixing with and intimately dispersing within the polymer a quantity of a stabilizing agent selected from the group consisting of the oxides and sulfides of the group IIB metals, i.e., zinc oxide and zinc sulfide, cadmium oxide, cadmium sulfide, mercuric oxide and mercuric sulfide.

It has been found that the thermal stability of polymers of trifluorochloroethylene may be improved by the addition of at least one of the above enumerated compounds or stabilizing agents. The ability to retard degradation at high temperatures is peculiar to the stabilizing agents of this invention. Thus, compounds such as titanium dioxide and silica have no effect on the polymer while compounds of iron, copper and selenium and the metal halides promote degradation.

Stabilization of the polymer is effected by admixing with, and intimately dispersing within the polymer between about 0.1% and about 20%, preferably between about .1 and about 10% of at least one of the stabilizing agents listed above. The exact concentration of the stabilizing agent in the polymer will be determined by the use for which the polymer is intended. Thus, when the polymer is to be used as a molding powder, it is preferred to use between about 0.2 and about 2% of the stabilizing agent, whereas when used in the form of a dispersion, for example, in xylene, di-isobutyl ketone, amyl acetate, water, acetone, etc. it is preferred to use between about 3% and about 7% of the stabilizing agent. As was indicated above, the stabilizing agents of this invention retard degradation of the polymer at high temperatures, but do not otherwise alter the physical and chemical characteristics except for color. Obviously, since the stabilizing agents are themselves colored, they will impart their characteristic color to the polymer. Usually, the fact that the polymer becomes colored as a result of the stabilization process, will not be objectionable. However, since the stabilizing agents of this invention cover a wide range of colors it will be possible by blending of two or more of the stabilizing agents to impart a variety of colors to the polymer. Generally, when two or more of the stabilizing agents are used, at least about 10% and less than about 90% of each is present in the mixture or blend. Preferably, these blends of stabilizing agents are made so that between about 20 and about 40% of each of the individual compounds is present. Still more preferably when blends are used, equal quantities of each of the components is employed, although any blend may be used which gives the desired color. In this connection, it may at times be desirable and is, therefore, within the scope of this invention to add inert compounds such as titanium dioxide to improve the color characteristics of the stabilizing agent.

The polymers which are particularly suited to the process of this invention are high molecular weight, normally solid thermoplastic polymers as contrasted with low molecular weight polymers in the oil, grease or wax range. Since the determination of molecular weight of the perfluorochloroolefin polymers, such as polytrifluorochloroethylene, is tedious and expensive, it has become an accepted practice to express the molecular weight of the polymer in terms of its no strength temperature (N.S.T.) which is dependent on the molecular weight. Thus, homopolymers of trifluorochloroethylene which are suited to the process of this invention have a no strength temperature (N.S.T.) of above about 220° C.

This invention also contemplates the treatment of copolymers of trifluorochloroethylene containing below about 5 mol percent of fluorine-containing olefins, such as perfluorobutadiene, vinylidene fluoride, difluorodichloroethylene, difluoroethylene, trifluoroethylene, perfluorostyrene, perfluorocyclobutene, and phenyltrifluoroethylene. The polymers and copolymers which are to be treated, may contain up to about 25% of a fluorinated plasticizer. The fluorinated plasticizers are the lower members of the saturated perfluorochlorocarbon series, for example, polytrifluorochloroethylene in the oil to wax range. The addition of plasticizer to the polymer in some instances, advantageously modifies the characteristics of the polymer, for example, by increasing its pliability, etc. The presence of a copolymer or of a plasticizer or both will obviously effect the N.S.T. of the material. Usually, the N.S.T. will be depressed or lowered, depending upon the percentage of plasticizer and/or copolymer. Thus, the N.S.T. of a plasticizer copolymer may be as low as 200° C. The process of this invention is therefore applicable to polymers having an N.S.T. of at least 200° C. and preferably above 220° C.

Admixing of the stabilizing agent with the polymer may be effected in a variety of ways although usually the conventional mechanical techniques are preferred. The method to be employed in effecting the admixture is based on the particle size of the polymer and the stabilizing agent. Thus, if both the polymer and stabilizing agent are in finely-divided form, conventional tumbling type mixers such as, a barrel mixer, conical mixer and mushroom mixer may be employed. If the polymer and stabilizing agent are not already finely-divided, then they must be ground in order to secure thorough admixture. Although the grinding of the stabilizing agent and of the polymer may be effected separately, it is preferred that they be ground together since the presence of the stabilizing agent will also retard thermal degradation which is apt to result during the grinding operation. Grinding of the polymer and stabilizing agent may also be effected in conventional equipment such as ball and pebble mills, colloid mills and hammer mills. A particularly suitable piece of grinding equipment is the Mikro-Pulverizer, a hammer type mill which functions by forcing the material being ground through an appropriate sized screen by means of a hammer action.

For purposes of this invention the polymer and stabilizing agent are considered as being finely-divided when about 100% passes through a #3½ (0.223") sieve. Preferably, at least 95% passes through #7 (0.11") and still more preferably at least 95% passes through a #12 (0.066") sieve. Admixing is more quickly effected and degradation of the polymer during the grinding operation prevented when the stabilizing agent is in a more finely-divided form initially. Preferably, 100% of the stabilizing agent should pass through a #270 (0.0021") sieve, and still more preferably at least 98% through a #325 (0.0017") sieve. The sieve sizes given above are in the U.S. Standard Series, the number in parenthesis is the sieve opening in inches.

In a preferred method of operation, between 30 and about 70% of the finely-divided stabilizing agent is dry-blended with the polymer. The dry-blended powder is then put through a Mikro-Pulverizer fitted with between about an 0.02" and about 0.2" screen preferably, with an 0.06" screen to insure thorough mixing. This stabilized "concentrate" is than dry-blended with an additional quantity of unstabilized polymer to reduce the concentration of stabilizing agent to the desired level. This finely-divided stabilized polymer powder has a low apparent density and is suitable for use in certain types of molding operations such as compression molding. In other types of molding operations, such as extrusion and injection molding, a high density molding powder is preferred. The low density molding powder is converted to a high density powder by passing it through an extruder and a multiplicity of rod dies. A rotating chopper in front of the die cuts the extruded rod into granules of a desired size. To minimize polymer degradation during this operation, the temperature is maintained just high enough to compact the powder into granules without converting them completely into homogeneous pellets.

The low density molding powder may also be prepared for use in a dispersion. Conversion of the low density powder to a dispersion grade powder is effected by grinding in a suitable mill, such as a ball mill, to reduce the particle size to the extent that about 98% will pass through a #270 sieve preferably through a #325 sieve. The higher concentration of stabilizing agent which is used with dispersion grade polymers serves to further retard degradation of the polymer during the prolonged grinding operation and also serves to retard degradation during use since dispersion grade polymer is usually used in the form of thin films which are more subject to high temperature effects. After grinding to the desired particle size, the stabilized polymer is then admixed with a suitable vehicle. Suitable vehicles are those which are generally known as "lacquer thinners" such as xylene, acetone, di-isobutyl ketone, etc. A particularly suitable vehicle is a mixture of xylene and di-isobutyl ketone. In applications where solvents are objectionable, aqueous dispersions may be used. Usually, between about 10 and about 30% of the stabilized polymer is added to the vehicle depending on the method of application of the dispersion. Generally, higher concentrations of polymer are used when a dispersion is to be applied by dip or brush techniques whereas spray techniques usually require a lower solids concentration.

Molding of the low or high density stabilized powder may be accomplished by using suitable molding equipment at temperatures between about 415° F. and 625° F. and a pressure between about 500 and about 25,000 pounds per square inch. Detailed description of preferred molding processes may be found in U.S. Patents Nos. 2,617,149, 2,617,150, 2,617,151 and 2,617,152, issued November 11 1952 to Louis C. Rubin. When used in the form of a dispersion the polymer contained in a suitable vehicle such as a mixture of xylene and di-isobutyl ketone is applied by spray, brush or dip techniques, and is air-dried or heat-dried at a temperature up to about 302° F. after which it is fused at a temperature between about 464° F. and about 482° F. for a period of time between about one hour and about 24 hours, preferably about 12 hours to insure the production of a homogeneous film of high tensile strength.

When the stabilized polymer of this invention is fabricated by any of the above described processes, a homogeneous polymer-mass is produced which contains intimately dispersed within its mass the added stabilizing agent.

In order to more fully illustrate the process of this invention a number of samples were prepared containing various metal compounds including the stabilizing agents of this invention. These specimens were prepared from the homopolymer of trifluorochloroethylene having an N.S.T. of about 322° C. About 1% of the indicated compound or blend of compounds was admixed with the polymer by using the preferred blending technique described herein. The various samples were compression molded into specimens of sufficient size for the determination of N.S.T. These data, which are presented in the table below, are offered for purpose of illustration and are not to be construed as unnecessarily limiting the invention.

Table

| Specimen No. | Compounds Added | Initial N.S.T. | N.S.T. After 1 Hour at 310°–340° C. |
|---|---|---|---|
| 1 | cadmium and zinc oxide | 322 | 291 |
| 2 | cadmium, chromium, titanium and zinc oxide. | 324 | 283 |
| 3 | cadmium sulfide | 323 | 273 |
| 8 | none | 321 | 237 |
| 9 | do | 322 | 235 |
| 10 | cadmium and selenium oxides | 325 | 235 |
| 13 | iron, chromium and zinc oxides | 315 | 221 |
| 14 | selenium and cadmium oxides | 317 | 210 |
| 15 | do | 317 | 210 |

From the above table, it is apparent that the compounds referred to herein as stabilizing agents, markedly retard degradation of the polymer. The use of compounds containing selenium and iron results in degradation of the polymer even though a quantity of stabilizing agent is also present. Compounds, such as titanium dioxide, neither retards nor accelerates the degradation of the polymer and therefore, may be used with the stabilizing agents if desired.

As indicated previously, the stabilizers of this invention can be used to stabilize perfluorochloroolefin copolymers. To illustrate this point, a copolymer of trifluorochloroethylene and vinylidene fluoride (approximately 96/4 mol ratio) was tested. In this test, approximately 15 gram samples containing 1 weight percent of stabilizer were prepared. A "standard pressing" and a "degradation pressing" were made. The standard pressings were made by heating each sample for 3 minutes at 260° C. followed by pressing for 3 minutes at 260° C. and 10,000 p.s.i. The degradation pressings were made by heating for 5 minutes at 300° C. followed by heating for 5 minutes at 300° C. and 10,000 p.s.i. In each case the sample was cooled for 4 minutes prior to determination of Z.S.T. value which was made by the procedure described in Modern Plastic, October 1954, page 156. The following results were obtained.

Z.S.T. value

| Sample | Standard Pressing | Degradation Pressing |
|---|---|---|
| Control | 305 | 170 |
| Zinc Oxide | 317 | 297 |
| Zinc Sulfide | | 181 |
| Cadmium Sulfide | 330 | 268 |
| Mecuric Oxide | 317 | 262 |

Substantially equivalent results are obtained using cadmium oxide and mercuric sulfide in concentration of 1 weight percent.

In the specification and claims the concentration of the stabilizer is given in percent by weight. It is to be understood that the percentage figures are by weight based on the weight of the thermoplastic perfluorochloroolefin polymer.

Various modifications and alterations of the process of this invention will become apparent to those skilled in the art and may be used without departing from the scope of this invention.

Having thus described my invention, I claim:

1. A novel plastic composition with improved heat stability which comprises an admixture of a normally solid polymer consisting of above about 95 mol percent trifluorochloroethylene and correspondingly below about 5 mol percent of vinylidene fluoride, and a minor proportion of at least one inorganic compound selected from the group consisting of zinc oxide, zinc sulfide, cadmium oxide, cadmium sulfide, mercuric oxide and mercuric sulfide.

2. The composition of claim 1 wherein said inorganic compound is cadmium sulfide.

3. The composition of claim 1 wherein said inorganic compound is cadmium oxide.

4. The composition of claim 1 wherein said inorganic compound is zinc sulfide.

5. The composition of claim 1 wherein said inorganic compound is zinc oxide.

6. The composition of claim 1 wherein said inorganic compound is mercuric oxide.

7. The composition of claim 1 wherein said inorganic compound is a mixture of zinc oxide and cadmium oxide.

8. The composition of claim 1 wherein said inorganic compound is a mixture of cadmium oxide, chromium oxide, titanium dioxide and zinc oxide.

9. A novel plastic composition with improved heat stability which comprises an admixture of a normally solid polymer consisting of above about 95 mol percent trifluorochloroethylene and correspondingly below about 5 mol percent of vinylidene fluoride, and between about 0.1% and about 20% of at least one inorganic compound selected from the group consisting of zinc oxide, zinc sulfide, cadmium oxide, cadmium sulfide, mercuric oxide and mercuric sulfide.

10. The composition of claim 9 wherein said normally solid polymer is trifluorochloroethylene homopolymer.

11. A novel plastic composition for use as a molding powder comprising an admixture of a normally solid polymer consisting of above about 95 mol percent trifluorochloroethylene and correspondingly below about 5 mol percent of vinylidene fluoride, and between about 0.2% and about 2% of at least one compound selected from the group consisting of zinc oxide, zinc sulfide, cadmium oxide, cadmium sulfide, mercuric oxide and mercuric sulfide.

12. A novel plastic composition for use in a dispersion comprising an admixture of a normally solid polymer consisting of above about 95 mol percent trifluorochloroethylene and correspondingly below about 5 mol percent of vinylidene fluoride, and between about 3% and about 7% of at least one inorganic compound selected from the group consisting of zinc oxide, zinc sulfide, cadmium oxide, cadmium sulfide, mercuric oxide and mercuric sulfide.

13. A process for improving the thermal stability of trifluorochloroethylene polymers which comprises admixing with a normally solid polymer consisting of above about 95 mol percent trifluorochloroethylene and correspondingly below about 5 mol percent of vinylidene fluoride, between about 0.1% and about 20% by weight of a stabilizer selected from the group consisting of zinc oxide, zinc sulfide, cadmium oxide, cadmium sulfide, mercuric oxide and mercuric sulfide.

14. A novel plastic composition which comprises a normally solid polymer consisting of above about 95 mol percent trifluorochloroethylene and correspondingly below 5 mol percent of vinylidene fluoride, and between about 0.2 and about 2 percent of cadmium oxide and zinc oxide.

15. A novel plastic composition which comprises a normally solid polymer consisting of above about 95 mol percent trifluorochloroethylene and correspondingly below 5 mol percent of vinylidene fluoride, and between about 3 and about 7 percent of cadmium oxide and zinc oxide.

References Cited in the file of this patent

UNITED STATES PATENTS

| | | |
|---|---|---|
| 2,140,518 | Doolittle | Dec. 20, 1938 |
| 2,161,024 | Doolittle | June 6, 1939 |
| 2,479,957 | Newkirk | Aug. 23, 1949 |
| 2,482,293 | Sanders | Sept. 20, 1949 |
| 2,676,940 | Kenyon | Apr. 27, 1954 |
| 2,686,738 | Teeters | Aug. 17, 1954 |
| 2,737,505 | Finholt | Mar. 6, 1956 |
| 2,833,752 | Honn et al. | May 6, 1958 |